(12) United States Patent
Booth et al.

(10) Patent No.: US 7,716,712 B2
(45) Date of Patent: May 11, 2010

(54) NARROWBAND INTERFERENCE AND IDENTIFICATION AND DIGITAL PROCESSING FOR CABLE TELEVISION RETURN PATH PERFORMANCE ENHANCEMENT

(75) Inventors: Ted Nelson Booth, Sellersville, PA (US); Robert L. Howald, Warrington, PA (US)

(73) Assignee: General Instrument Corporation, Horsham, PA (US)

( * ) Notice: Subject to any disclaimer, the term of this patent is extended or adjusted under 35 U.S.C. 154(b) by 141 days.

(21) Appl. No.: 10/465,339

(22) Filed: Jun. 18, 2003

(65) Prior Publication Data

US 2004/0261118 A1  Dec. 23, 2004

(51) Int. Cl.
*H04N 7/173* (2006.01)
*G06F 15/173* (2006.01)

(52) U.S. Cl. .................. 725/121; 725/107; 725/124; 709/223; 709/224

(58) Field of Classification Search ............... 725/107, 725/121–127; 709/222–224; 375/346
See application file for complete search history.

(56) References Cited

U.S. PATENT DOCUMENTS

| | | | | |
|---|---|---|---|---|
| 4,234,880 A | * | 11/1980 | Klemm | 342/159 |
| 5,014,318 A | * | 5/1991 | Schott et al. | 704/233 |
| 5,260,980 A | * | 11/1993 | Akagiri et al. | 375/241 |
| 5,381,357 A | * | 1/1995 | Wedgwood et al. | 708/319 |
| 5,706,013 A | * | 1/1998 | Melvin et al. | 342/159 |
| 5,765,097 A | * | 6/1998 | Dail | 725/125 |
| 5,859,661 A | * | 1/1999 | Dzuban | 725/127 |
| 5,881,363 A | * | 3/1999 | Ghosh et al. | 725/125 |
| 5,933,797 A | * | 8/1999 | H.ang.akansson et al. | 702/191 |
| 5,939,887 A | | 8/1999 | Schmidt et al. | |
| 6,041,340 A | | 3/2000 | Mintzer et al. | |
| 6,131,013 A | * | 10/2000 | Bergstrom et al. | 455/63.1 |
| 6,181,753 B1 | * | 1/2001 | Takada et al. | 375/346 |

(Continued)

FOREIGN PATENT DOCUMENTS

EP  0748120  12/1996

OTHER PUBLICATIONS

Liersch, G.; Dick, C., "Reconfigurable gate array architectures for real time digital signal processing," Signals, Systems and Computers, 1994. 1994 Conference Record of the Twenty-Eighth Asilomar Conference on, vol. 2, pp. 1383-1387, 31 Oct-2 Nov, 1994.*

(Continued)

*Primary Examiner*—Son P Huynh
(74) *Attorney, Agent, or Firm*—Larry T. Cullen

(57) ABSTRACT

An adaptive data stream filter removes narrowband interference from the CATV return path prior to these paths being combined in the network. A method for removing narrowband interference from the CATV return path detects potential narrowband interference in real-time and adapts a filter to remove this potential narrowband interference. An exemplary embodiment of the above method uses previously created filters that are combined based on detected interference in an adaptive manner to continually adapt to new interference sources. Another exemplary embodiment of the above method calculates new filter coefficients for the data stream filter based on detected interference. In another embodiment, two filters are operated in a ping-pong manner for each band of interference identified as above threshold. This enables updating of one filter while another filter is performing the data stream filter operation.

6 Claims, 1 Drawing Sheet

U.S. PATENT DOCUMENTS

| | | | |
|---|---|---|---|
| 6,212,229 B1* | 4/2001 | Salinger | 375/224 |
| 6,215,514 B1* | 4/2001 | Harris | 725/74 |
| 6,292,760 B1* | 9/2001 | Burns | 702/189 |
| 6,323,793 B1 | 11/2001 | Howald et al. | 341/137 |
| 6,327,709 B1* | 12/2001 | Ovadia et al. | 725/124 |
| 6,360,369 B1* | 3/2002 | Mahoney | 725/111 |
| 6,385,773 B1* | 5/2002 | Schwartzman et al. | 725/124 |
| 6,425,132 B1* | 7/2002 | Chappell | 725/107 |
| 6,426,983 B1* | 7/2002 | Rakib et al. | 375/346 |
| 6,483,872 B2* | 11/2002 | Nguyen | 375/231 |
| 6,574,797 B1* | 6/2003 | Naegeli et al. | 725/120 |
| 6,772,437 B1* | 8/2004 | Cooper et al. | 725/111 |
| 6,775,840 B1* | 8/2004 | Naegel et al. | 725/111 |
| 6,880,170 B1* | 4/2005 | Kauffman et al. | 725/125 |
| 6,940,973 B1* | 9/2005 | Yeap et al. | 379/416 |
| 7,024,680 B2* | 4/2006 | Howard | 725/107 |
| 7,086,083 B2* | 8/2006 | Zhang et al. | 725/143 |
| 7,254,827 B1* | 8/2007 | Terreault | 725/125 |
| 2002/0022957 A1* | 2/2002 | Kiuchi et al. | 704/226 |
| 2002/0085626 A1* | 7/2002 | Starr | 375/149 |
| 2002/0094044 A1* | 7/2002 | Kolze et al. | 375/346 |
| 2002/0193130 A1* | 12/2002 | Yang et al. | 455/501 |
| 2002/0196876 A1* | 12/2002 | Takada | 375/346 |
| 2003/0208775 A1* | 11/2003 | Roberts et al. | 725/125 |

OTHER PUBLICATIONS

Supplementary European Search Report, from the European Patent Office for EP 04754807. Issued Aug. 18, 2006.

* cited by examiner

NARROWBAND INTERFERENCE AND IDENTIFICATION AND DIGITAL PROCESSING FOR CABLE TELEVISION RETURN PATH PERFORMANCE ENHANCEMENT

FIELD OF THE INVENTION

The present invention is directed to methods and apparatuses for communicating over a cable network, and more particularly to a method and apparatus for communicating over a cable network in a bi-directional manner.

BACKGROUND

Cable Television (CATV) Networks have been undergoing rapid upgrading, particularly in North America, to provide advanced services, such as digital video, telephony and Internet services. A major part of the upgrade cycle has been the development of the return path network—the path from residential subscribers to the CATV Headend. Previously, this portion of the network was used very little, and only for minor maintenance and billing operations. As interactivity needs grew and CATV technology advanced, this portion of the network became more significant. Now, the CATV return path forms a critical portion of the system for two-way interactivity, such as telephony and data traffic.

One key issued in determining the performance of the CATV return path is the quality of the return cable channel. Within this path, one of the most significant impairments to quality signal transmission arises from external interference, typically caused by narrowband interference of radio waves or in-home sources that generate narrowband frequency domain noise that falls within the return band of 5-42 Megahertz (MHz) (North America). Additionally, it is commonly the case that return path networks, when terminated at a CATV Headend, are combined with other return path networks. Thus, interference from one return leg of one network not only degrades or ruins the channel within which such interference falls, but also ruins channels on other legs that otherwise are clean until they reach the combining point at the CATV Headend.

In many two-way HFC communication networks, return path systems are limited in performance by interference generated from multiple reverse path sources in the plant and in homes. Additionally, the return path is band limited, so the spectrum obscured by interference is very valuable.

Today, field personnel perform extensive testing and troubleshooting throughout the network to identify potential narrowband interference sources. This is a costly and ongoing, time-consuming process. Moreover, many of the problems exist inside homes and therefore cannot be addressed by such troubleshooting.

The present invention is therefore directed to the problem of developing a method and apparatus for improving the performance of return paths in two-way HFC communication networks.

SUMMARY OF THE INVENTION

The present invention solves these and other problems by removing narrowband interference from the CATV return path prior to these paths being combined in the network.

According to one aspect of the present invention, a method for removing narrowband interference from the CATV return path detects potential narrowband interference in real-time and adapts a filter to remove this potential narrowband interference.

According to another aspect of the present invention, an exemplary embodiment of the above method uses previously created filters that are combined based on detected interference in an adaptive manner to continually adapt to new interference sources.

According to yet another aspect of the present invention, an exemplary embodiment of the above method calculates new filter coefficients for a data stream filter based on detected interference in an adaptive manner to continually adapt to new interference sources.

According to still another aspect of the present invention, two filters are operated in a ping-pong manner to enable updating of one filter while another filter is performing the data stream filter operation.

DETAILED DESCRIPTION

It is worthy to note that any reference herein to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

U.S. Pat. No. 6,323,793 discloses an enhanced approach to return path design, which depicts a way to architect this part of the system, as well as provide the flexibility for the introduction of further technology advances with minimal network disruption. This patent is hereby incorporated by reference as if repeated herein in its entirety, including the drawings. The referenced patent above provides a means for transport of digital signals on the return path. A benefit of the digital approach is that processing techniques become available through which the spectrum can be manipulated.

According to one aspect of the present invention, spectrum manipulation involves performing a frequency domain analysis on the return path using Fast Fourier Transform (FFT) techniques, identifying interference above particular threshold levels. Following this, an algorithm is implemented that filters out this portion of the band, essentially cleansing the spectrum, and restoring the capability of this portion of the spectrum for traffic on other parts of the cable plant connected to it via combining. This algorithm and digital filtering operation can be programmed remotely or made to be able to adapt automatically to channel characteristics it learns while observing the spectrum.

Cable modem technology, such as that used in return path systems, has been developed to help mitigate this interference and restore reasonable performance. These mitigation techniques require sophisticated digital processing that has limitations on how much can be accomplished without sacrificing performance in other areas, such as against additional return path impairments. Thus, this technique also eases the processing load on subsequent modem operations, freeing it up to provide processing to enhance composite performance against all impairments.

Design Implementation

Figure 1:
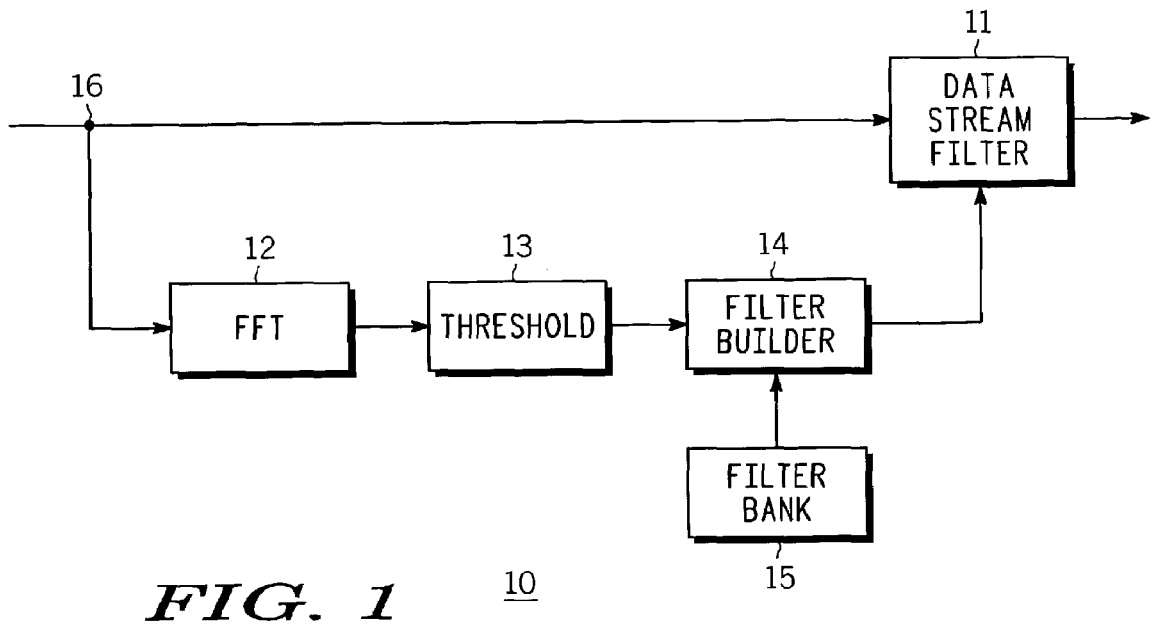
FIG. 1 shows a block diagram of an exemplary embodiment of a method for filtering a data stream on a digital return path according to one aspect of the present invention.

A summary of the operation in hardware and software is as follows. Refer to FIG. 1. The digitized RF return path, implemented as previously described, is passed to the new digital processing block, an exemplary embodiment 10 of which is shown in FIG. 1. Exemplary embodiment 10 includes a splitter 16 through which the data stream is passed so that one copy of the data stream is coupled to a data stream filter while another copy of the data stream is passed through a feed forward path. The first block on the feed forward path includes a Fast Fourier Transform 12, which breaks down the data stream into its spectral components. A threshold detector 13 identifies those spectral components that are above a predetermined, but programmable or adaptable, threshold. Typically, interference on the CATV return path is narrowband as compared to the data, hence this interference is identifiable by examining the frequency spectrum and looking for elements that occupy only a narrow portion of the band and exceed normal signal levels. These statistical characteristics and signal type identification processes can also be performed with digital processing in field environments using intelligent processing techniques. Such techniques, however, require more computational power than typically exists in field applications of return path systems today or proposed herein. A filter builder 14 selects appropriate filters from a filter bank 15 to filter out those spectral components whose values exceed the predetermined threshold. The output of the filter builder is a data stream filter 11, which is then used in the next clock cycle, as will be described below.

In essence, the incoming data passes through an adjustable filter 11. At start up, this adjustable filter 11 is loaded with an all pass filter that does not alter the spectral content of the data stream. If unwanted frequencies are found in the data stream during a threshold detection process 13, new filter coefficients are loaded into the filter 11 to remove those frequencies. The new filter coefficients are used until a new set of filter coefficients is needed or determined. Continuous, real-time data processing is used to constantly monitor the input spectrum, and make adjustments to the input filter 11 as necessary to suppress interference adaptively.

Figure 2:
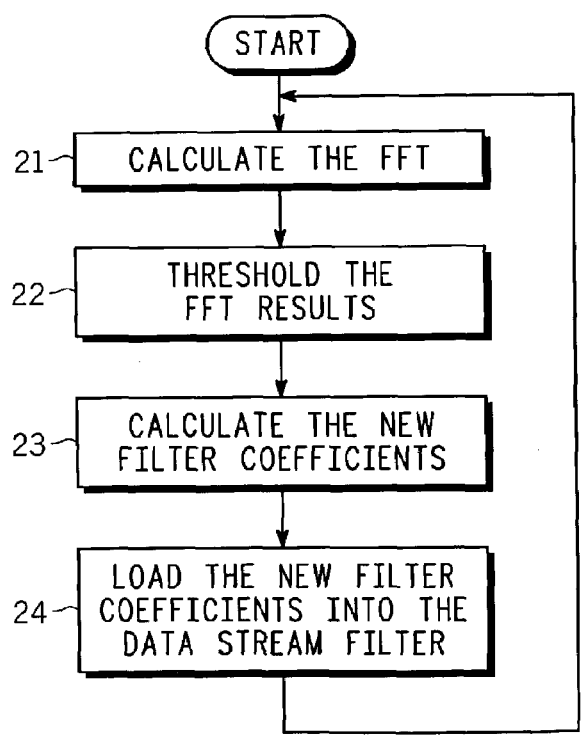
FIG. 2 shows a flow chart of an exemplary embodiment of a method for filtering a data stream on a digital return path according to another aspect of the present invention.

Turning to FIG. 2, shown therein is an exemplary embodiment 20 of an algorithm for filtering a data stream on a digital return path. The process 20 begins by calculating a Fast Fourier Transform (element 21). Once the spectral components of the data stream are identified, these components are compared against a predetermined threshold (element 22). Those spectral components whose value exceeds the predetermined threshold are then identified and filter coefficients are calculated to filter out these spectral components (element 23). These calculated filter coefficients are then loaded into a data stream filter (element 24), which filters the identified spectral components in the data stream. Details on each of the sub-processes follow.

Fast Fourier Transform (FFT)

Determining the coefficients—and thus setting the filter shape—for the adaptive filter is done by spectrum analysis on the data stream. The process begins by collecting a sample of the input data stream. The Fast Fourier Transform (FFT) of the sampled data is calculated to find the spectral content of the input data stream. This spectral content is represented by an array, where each element in the array represents a range of frequencies. The first element represents the smallest frequencies, and each successive element represents a higher frequency range.

The format of the FFT results uses complex numbers so additional processing is required to make the results usable. One option is to calculate the absolute value of each complex number. However, calculating the square root that is required by the absolute value is very computation intensive and is an undesired complexity in practical implementation. A simpler option is to calculate the sum of the squares of the real and imaginary components of the complex number. These are other straightforward mathematical approaches as well to glean the desired information.

For some applications, the entire frequency range may not be of interest. If this is the case, then only the elements of the FFT array that represent the frequencies of interest need be reformatted. The final result of this stage is an array of real numbers that represent the spectral content of the frequencies of interest. A further advantage of this knowledge, which is typically known by an operator ahead of time, is that it allows for higher spectral resolution from the same size FFT implementation, meaning that narrower slices of the frequency domain can be examined and scrutinized.

Threshold Detection

When the FFT results are in a usable format, the array is compared against a threshold value. The threshold value can be established in several different ways. The first option is to use a preset value that is set at start time and does not change over time. The second option is calculate the threshold value by inspecting the FFT results. The adjusted threshold value is then used for the current round of comparisons and is also used as the initial value in the next round of comparisons. An additional layer of sophistication is to include a running average of accumulated array samples, building a database of channel characteristics, and adjusting the threshold based on learned channel characteristics and the duration and dynamics of the interference observed.

The result of each comparison of the FFT results versus the threshold value is recorded into a comparison array. If an element of the FFT array is greater than or equal to the threshold, then a value of 1 is recorded in the corresponding location of the comparison array, otherwise a value of 0 is recorded.

The comparison array is then used in the next stage to create a new filter that will be used to filter the data stream. Each element in the comparison array that has a value of 1 represents a range of frequencies that are to be filtered out of the data stream.

Filter Implementation

The filter can be either an Infinite Impulse Response (IIR) filter or a Finite Impulse Response (FIR) filter. Either type of filter can be designed by one of two different methods.

The first method is a direct approach. This approach uses the comparison array to establish the specifications for the new filter and then uses those specifications to directly calculate the new filter coefficients. This method can be very computation intensive in practice and adds complexity to the design.

Another method is an indirect approach. It uses pre-designed filters that are combined to create the new filter. For this method, a bank of filters is established at start time. Each entry in the bank corresponds to an entry in the comparison array. If an entry in the comparison array as a value of 1, then the corresponding filter is pulled out of the filter bank and is used to build the new filter. This method is less computation intensive than the direct method, but requires memory to hold the bank of filters. This bank could be quite large for some variations of this design.

The result of either method will be a filter that has a notch for each frequency range that exceeds the threshold value. As a result, that frequency range will be removed when the filter is applied to the data stream.

The last step of the process is to take the new filter coefficients and load them into the data stream filter. If all of the coefficients can be loaded simultaneously in one clock cycle, then the filtering of the data stream can continue with no interruptions. If all the coefficients cannot be loaded in one clock cycle, then it may be necessary to have two filters. The first filter processes the data stream using the current filter coefficients while the second filter is being loaded with the new filter coefficients. Once the second filter is loaded and properly initialized, it starts processing the data stream and the first filter is turned off so that it can be loaded with the coefficients of the next filter. The two data stream filters would then alternate in a ping-pong fashion.

This process may be repeated periodically. It can be restarted at the end of each round. It can be run periodically based on a clock, or it can be triggered to run based upon some outside event. It can also be instigated by remote command if such a communication channel is available. Meanwhile, the data stream filter is continuously processing the incoming data based on the filter coefficients that were last loaded. The precise dynamics of the update rate can be optimized based on plant models, acceptable cost and complexity trade-offs, individual operator preferences, and tolerance for channel availability. Any or all such variables can be fixed or made configurable, and all under the control of the system operator.

Technology Aspects

There are several technology challenges to implement this system. The two major obstacles are the potential size of the notch filter required to process the input data stream and the 100 MHz—range real-time processing clock rate.

The filter design issues are as follows. The stringency of the specifications that are used to design the filter will determine its order, N. A typical filter structure will often require (N/2)+1 multipliers and N+1 adders. As the order of the filter increases, the computational intensity of the filter also increases. As always, a trade-off can be made between the fidelity of the filter and the amount of resources that are required to implement the filter. These resources include the size of the field programmable gate array (FPGA) and memory needed to implement the design.

With respect to clock speed, the primary issue is the ability to process the incoming data in real-time. Since the data is arriving at 100 MHz, the output of the system must provide the results at 100 MHz. A small initial latency at start time is acceptable, but, once running, it must provide an output for each input at the 100 MHz rate. The ability to process data at this speed is state of the art for most of the technologies that are currently available.

The two technologies that hold the most promise are Digital Signal Processors (DSPs) and Field Programmable Gate Arrays (FPGAs). The DSP's strengths are that it can run lots of different software and is easily re-programmable. It would be ideal for directly computing a new notch filter for each round of processing. However, the amount of processing that is required to process a $100^{th}$ order FIR filter in real-time at 100 MHz is beyond the capabilities of any DSP chip that is currently available. As a result, the FPGA is a better technology implementation choice today. However, existing capabilities notwithstanding, the strengths of the DSP make it an attractive option as future DSP developments increase processing speed capabilities, and future designs may find this approach as a powerful architectural fit.

Field Programmable Gate Array Implementations

Real-time processing of data is a major strength for an FPGA. Its internal construction allows it to be configured to perform many operations in parallel. As a result, complex filters can be implemented in real-time at 100 MHz. In addition, the FPGA can be reprogrammed to use different filter coefficients or a new filter structure without any need to make other changes to the system.

The main constraint of the FPGA is its flexibility. Once configured, it can only perform that limited functionality until it is reprogrammed. Thus, it is not suitable directly for computing a new filter. This weakness of the FPGA makes its use consistent with the indirect method previously described, which uses a bank of pre-designed filters to create a new filter.

The above discussion describes two technologies available for this application. The first is an FPGA only architecture, while the second is an FPGA and DSP combination. The FPGA only method uses an FPGA to handle the entire processing. It calculates the FFT and designs the new filter while simultaneously filtering the incoming data stream. This method would probably be the most cost effective, but is less flexible.

An alternative uses both a DSP and an FPGA. The FPGA is responsible for filtering the incoming data stream in real-time. The process of designing the new filter is handled by the DSP. The FFT and threshold calculations can be handled by either the FPGA or the DSP. The FPGA will compute the FFT faster, but this will use up some valuable resources of the FPGA that may be necessary for optimal filter implementation.

Either architecture allows for future changes. The threshold value can be updated to a new value. The structure of the filter that is used to process the data stream and the method used to design the new filter can both be modified at a later time. This scalability with technology is a key advantage of digitized return processing, because CATV networks incur periodic upgrades and changes to support new applications and services, as well as to incorporate more cost-effective architectures and technologies.

Conclusion

CATV networks are continually upgrading and changing to support new services, as the Hybrid Fiber Coax infrastructure to the home has become a two-way communication platform. In light of these developments, techniques that assure the most effective use of the return path become particularly powerful means by which operators can get the most out of their investment in infrastructure. Frequency domain analysis, processing, and mitigation techniques that leverage already existing digitized return path equipment provide an avenue for operators to achieve network benefits. The narrowband interference detection and mitigation technique described herein assures that the HFC return path is used to its greatest extent. In this case, the processing provides a technique to gain back what is otherwise corrupted bandwidth, restoring user traffic capability in a frequency band that had previously been unusable or degraded. Advantages to the operator with enhanced digital processing distributed in the field in this way offer improvements in transmission performance. The result is the ability to most successfully implement revenue-generating two-way services associated with technological upgrades, such as cable modems and voice telephony.

Although various embodiments are specifically illustrated and described herein, it will be appreciated that modifications and variations of the invention are covered by the above teachings and are within the purview of the appended claims without departing from the spirit and intended scope of the invention. For example, the present invention has been described in relation to cable television systems, however, the same technique could be applied to other communications systems. Furthermore, this example should not be interpreted to limit the modifications and variations of the inventions covered by the claims but is merely illustrative of one possible variation.

What is claimed is:

1. A method for eliminating unwanted interference in a digital return path of a cable television network comprising:
   receiving an incoming data stream transmitted from a network element, the incoming data stream being configured to provide communications between the cable television network and the network element;
   splitting the incoming data stream into two paths;
   performing a Fast Fourier Transform on the incoming data stream in a first path to determine characteristics of interference in the incoming data stream;
   calculating an adaptable interference threshold based on the determined characteristics, the calculated adaptable interference threshold not being selected from a preset value;
   identifying any spectral components of the incoming data stream that exceed the adaptable interference threshold;
   creating an adaptive filter to filter any identified spectral components based on the identified spectral components; and
   filtering the incoming data stream with the adaptive filter to thereby filter ingress noise, and
   loading a first plurality of filter coefficients into a first data stream filter while a second data stream filter is used to filter the data stream; and
   upon calculating a second plurality of filter coefficients loading the second plurality of filter coefficients into the second data stream filter while the first data stream filter is used to filter the data stream,
   wherein the step of creating an adaptive filter includes creating a plurality of filter coefficients based on the identified spectral components; and using the newly created plurality of filter coefficients in a next clock cycle when filtering the incoming data stream with the adaptive filter,
   wherein the adaptable interference threshold is determined from a running average of accumulated array samples from the result of the Fast Fourier Transform, a database of channel characteristics, learned channel characteristics, a duration and dynamics of any observed interference.

2. The method according to claim 1, wherein the creating occurs on a near real-time basis.

3. The method according to claim 1, further comprising:
   selecting, based on the identified spectral components, one or more previously created filters from a filter bank storing a plurality of previously created filters.

4. The method according to claim 3, further comprising:
   combining two or more filters of the one or more previously created filters to form the adaptive filter.

5. A method for processing a data stream on a digital return path of a cable network comprising:
   receiving an incoming data stream transmitted from a network element, the incoming data stream being configured to provide communications between the cable television network and the network element;
   calculating a Fast Fourier Transform on the incoming data stream to determine characteristics of interference in the incoming data stream;
   calculating an adaptable interference threshold based on the determined characteristics, the calculated adaptable interference threshold not being selected from a present value;
   comparing a result of the Fast Fourier Transform against the adaptable interference threshold;
   calculating one or more new filter coefficients based on the comparing;
   loading the one or more new filter coefficients into a data stream filter;
   filtering the data stream with the data stream filter to thereby filter ingress noise;
   loading a first plurality of filter coefficients into a first data stream filter while a second data stream filter is used to filter the data stream; and
   upon calculating a second plurality of filter coefficients loading the second plurality of filter coefficients into the second data stream filter while the first data stream filter is used to filter the data stream, p1 wherein the adaptable interference threshold is determined from a running average of accumulated array samples from the result of the Fast Fourier Transform, a database of channel characteristics, learned channel characteristics, a duration and dynamics of any observed interference.

6. An apparatus for reducing interference in a digital return path of a cable network comprising:
   a field programmable gate array to receive a data stream in the digital return path which has been transmitted from a network element, the field programmable gate array being programmed to filter potential interference in the data stream in the digital return path, the data stream being configured to provide communications between the network and the network element; and
   a digital signal processor coupled to the field programmable gate array to reprogram the field programmable data array to remove the potential interference on an ongoing basis,
   wherein the digital signal processor performs a Fast Fourier Transform on the data stream to determine characteristics of interference in the data stream; calculates an adaptable interference threshold based on the determined characteristics, the calculated adaptable interference threshold not being selected from a preset value; compares the output of the fast Fourier transform against the adaptable interference threshold to identify potential sources of interferences; creates new filter coefficients based on the comparison for use by the field programmable gate array to use in subsequent filter operations to thereby filter ingress noise; loads a first plurality of filter coefficients into a first data stream filter while a second data stream filter is used to filter the data stream; and upon calculating a second plurality of filter coefficients loads the second plurality of filter coefficients into the second data stream filter while the first data stream filter is used to filter the data stream, and
   wherein the adaptable interference threshold is determined from a running average of accumulated array samples from the result of the Fast Fourier Transform, a database of channel characteristics, learned channel characteristics, a duration and dynamics of any observed interference.

* * * * *